United States Patent Office 3,812,151
Patented May 21, 1974

3,812,151
β-(2,4,6-TRIIODO-3-ACETAMIDINOPHENYL)-
PROPIONIC ACIDS
Heinrich Pfeiffer, Karl Heinz Kolb, Alois Harwart, and Paul E. Schulze, Berlin, Germany, assignors to Schering Aktiengesellschaft, Berlin and Bergkamen, Germany
No Drawing. Filed Nov. 6, 1970, Ser. No. 87,612
Claims priority, application Germany, Nov. 8, 1969, P 19 56 844.6
Int. Cl. C07d 27/04; C07c 101/44
U.S. Cl. 260—326.47                      17 Claims

ABSTRACT OF THE DISCLOSURE

Amidines of the formula

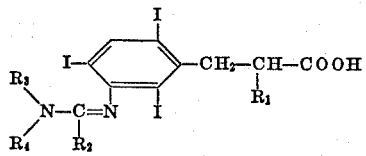

wherein $R_1$ is hydrogen or lower alkyl, $R_2$ is lower alkyl, and $R_3$ and $R_4$, which can be alike or different, each is a hydrogen atom or lower alkyl, or collectively with the nitrogen atom to which they are attached, a heterocyclic ring containing 0–1 additional hetero atoms selected from oxygen and nitrogen, including the physiologically acceptable salts thereof, are useful as radiopaque agent.

BACKGROUND OF THE INVENTION

This invention relates to novel amidines.

U.S. Pat. No. 3,119,859 discloses amidines whose carbon atom bridging the nitrogen atoms, in contrast to the compounds of this invention, is unsubstituted. The compounds of this invention are markedly superior as radiopaque, i.e., X-ray contrast, agents, particularly because of their rapid accumulation in the gallbladder duct. This is due, inter alia, to the particularly rapid resorption of the novel compounds from the gastrointestinal tract. Their excellent resorption provides the additional advantage that, when the gallbladder is being X-rayed, no interfering residues of the substance remain in the intestine. The toxicity of the novel compounds of this invention is about the same as to about half that of the conventional compounds.

SUMMARY OF THE INVENTION

The compounds of this invention have the general Formula I

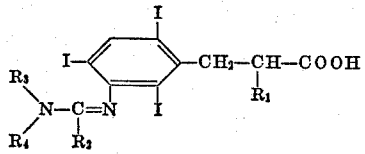

I wherein $R_1$ is hydrogen or lower alkyl, $R_2$ is lower alkyl, and $R_3$ and $R_4$, which can be alike or different, each is a hydrogen atom or lower alkyl, or collectively with the nitrogen atom to which they are attached, a heterocyclic ring containing 0–1 additional hetero atoms selected from oxygen and nitrogen, including the physiologically acceptable salts thereof. These compounds are useful as X-ray contrast agents, and are especially useful upon oral administration for contrasting the gallbladder ducts on X-ray examination.

DETAILED DISCUSSION

In the compounds of this invention, $R_2$ and $R_1$, $R_3$ and $R_4$, when lower-alkyl, e.g., methyl, ethyl, propyl, isopropyl, n-butyl, etc., are preferably methyl or ethyl. The term lower alkyl, whenever used herein, means containing 1–4 carbon atoms. $R_3$ and $R_4$, and the nitrogen atom to which they are attached, when forming a heterocyclic ring, collectively can form a 3–9, preferably 5–7 member ring, containing 2–8, preferably 4–5 carbon atoms, and 0–1 additional hetero atoms selected from nitrogen and oxygen, e.g., ethylenimino, pyrrolidino, 2- or 3-methyl-pyrrolidino, 2-ethyl-pyrrolidino, 2,3-, 2,4-, 3,4- or 2,5-dimethyl-pyrrolidino, piperidino, 2-, 3- or 4-methylpiperidino, homopiperidino, heptamethylenimino, morpholino, piperazino, N'-lower-alkyl, e.g., N'-methylpiperazino, N'-β-hydroxyethyl-, N'-β-hydroxypropyl- and N'-γ-hydroxypropylpiperazino, etc., preferably pyrrolidino, morpholino, piperazino and N'-substituted-piperazino. Specific examples are β-(2,4,6-triiodo-3-N-pyrrolidino-, -piperidino-, morpholino- and -N'-methylpiperazino-phenyl)-propionic acid.

The compounds of this invention can be reacted with any base which will form a physiologically acceptable salt thereof, including alkali-metal, alkaline-earth, ammonium and amine salts, e.g., sodium, potassium, calcium, magnesium, alkyl ammonium, dialkyl ammonium, trialkylammonium and hydroxyalkylammonium salts. Physiologically acceptable bases for converting the acids into the salts thereof are preferably sodium hydroxide, methylglucamine, alkaline earth hydroxides, and ethanolamine.

The process of U.S. Pat. No. 3,119,859 cannot be employed to produce the compounds of this invention because the reaction of 3-amino-2,4,6-triiodophenyl-fatty acids with N-substituted formamides employed therein does not yield the desired products when employing the corresponding higher amides.

The compounds of this invention can be prepared from novel compounds of the general Formula II

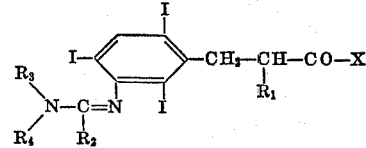

II wherein $R_1$, $R_2$, $R_3$ and $R_4$ have the values given above and —CO—X represents a masked carboxyl group, by splitting off the carbonyl masking group so as to form the free carboxylic acid group. The thus-produced free acid can thereafter be converted into a salt thereof.

Examples of masked carboxylic acid groups are esters, e.g., lower-alkyl, amides, including primary (-CONH₂), secondary lower-alkyl, (-CONH-lower-alkyl) and tertiary di-lower-alkylamides (—CON-lower-alkyl)₂.

Preferred masked carboxyl groups are ester and amide residues which can be split off, for example, by saponification, especially esters of the general Formula II wherein X is lower-alkoxy.

The above starting materials (II) can be prepared from corresponding conventional β-(2,4,6-triiodo-3-aminophenyl)-propionic acids by blocking the carboxylic acid group in a conventional manner, e.g., by esterification, and then acylating the amino group with an acid chloride or anhydride.

Reacting these 3-acylamino-2,4,6-triiodophenyl-fatty acid esters, amides or otherwise blocked acids, with an acid halogenide-forming agent, for example, phosphorus pentachloride thionyl chloride, phosphorus trichloride and phosphorus tribromide, in an inert solvent, novel β-(2,4,6-triiodo-phenyl)-propionic acid esters and amides are obtained having an acid imide chloride group in place of the starting acylamino group in the 3-position. These novel compounds are oils, readily soluble in solvents, which are very sensitive to moisture. The reaction can be conducted, e.g., at −10° C. to the boiling point of the reaction solvent, preferably +10 to +30° C., employing a chemical equivalent or greater amount of the acid halogenide-forming agent. It is surprising that the above-mentioned 3-acylamino compounds are not attacked by the highly reactive phosphorus pentachloride, either on the ester group or on the alkyl chain. Instead, they produce the desired reaction product in high yield. The thus-obtained imide chlorides are then converted, without isolation, into the compounds of general Formula II with ammonia or a primary or secondary amine, e.g., methylamine, ethylamine, dimethylamine, diethylamine, pyrrolidine and piperidine.

The above series of reaction are illustrated by the following reaction scheme:

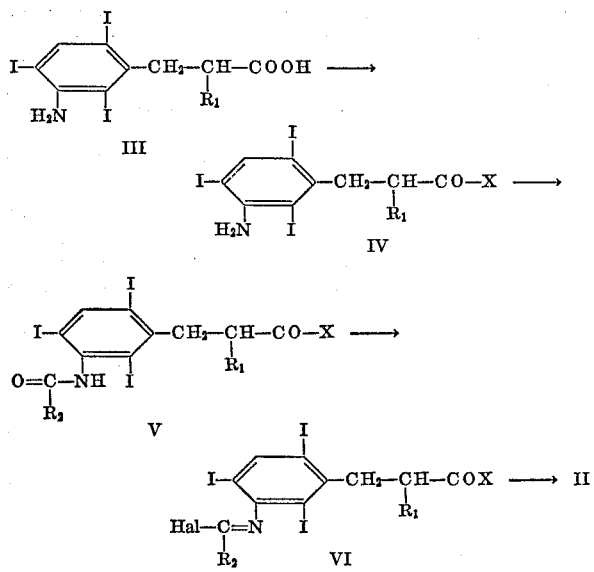

wherein $R_1$ and $R_2$ have the values given above and X is halogen, e.g., Cl or Br.

Th novel amidines of this invention can be administered in the forms customarily employed in pharmaceuticals in admixture with a pharmaceutically acceptable carrier. For oral administration, especially suitable are tablets, dragees, capsules, pills, suspensions and solutions. Suitable excipients for tablets are, for example, lactose, amylose, talc, gelatin, magnesium stearate, etc.

The compounds of this invention are formulated so as to provide, for example, 100 to 1000, preferably 400 to 750 mg., of the effective agent in admixture with 0.1 to 1 g. of a pharmacologically inert excipient, i.e., a pharmaceutically acceptable carrier, per unit dosage, e.g., per tablet.

The table below lists four compounds of this invention (Examples 2, 3, 6, and 8) and, for comparison purposes, β-(3-amino-2,4,6-triiodophenyl)-propionic acid (I), a starting material, β-(3-dimethylaminomethyleneamino-2,4,6-triiodophenyl)-propionic acid (II; "Iopodate") and α-ethyl - β - (3 - dimethylaminomethyleneamino-2,4,6-triiodophenyl)-propionic acid (III; U.S. Pat. No. 3,119,859).

TABLE

| Compound | $LD_{50}$ i.v., rat, mg./kg. | Rat, intraduodenal, 100 mg./kg. excreted via the gallbladder in percent of amount administered after— | | | | |
|---|---|---|---|---|---|---|
| | | 0.5 hr. | 1 hr. | 2 hrs. | 3 hrs. | 4 hrs. |
| Example: | | | | | | |
| 2 | 480 | 9 | 40 | 52 | 68 | 75 |
| 3 | 490 | 7 | 29 | 53 | 71 | 83 |
| 6 | 860 | 8 | 33 | 57 | 70 | 79 |
| 8 | 500 | 9 | 30 | 52 | 74 | 82 |
| I | 210 | 2 | 7 | 10 | 14 | 21 |
| II | 440 | 6 | 17 | 46 | 69 | 82 |
| III | 490 | 6 | 13 | 43 | 63 | 74 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees centigrade.

EXAMPLE 1

(a) β-(2,4,6-triiodo-3-aminophenyl)-propionic acid is esterified with methanol, adding 1.1 mol of thionyl chloride thereto (melting point of the methyl ester: 121–122°) and then acylated with acetyl chloride in the usual manner. A suspension of 22 g. of this methyl ester of β-(2,4,6-triiodo-3-acetylamino-phenyl)-propionic acid (M.P. 194–196°) is stirred in 370 ml. of methylene chloride with 9.2 g. of phosphorus pentachloride for 30 minutes, thus obtaining a solution. Under ice cooling, gaseous ammonia is introduced for 3–5 hours. By initial cooling, the temperature is limited maximally 30°. After 20 hours of agitation, the solution is separated from the precipitate, dried, dissolved with 400 ml. of benzene, washed with dilute alkaline solution and water, and evaporated to dryness under vacuum. Yield: 17 g. of crude methyl ester of β-(2,4,6-triiodo-3-acetamidinophenyl)-propionic acid, M.P. from 127°.

(b) 12 g. of β - (2,4,6-triiodo-3-acetamidinophenyl)-propionic acid methyl ester is saponified in 60 ml. of dioxane, 60 ml. of water, and 1.83 ml. of concentrated sodium hydroxide solution under agitation on a steam bath for 30 minutes. Thereafter, the dioxane is distilled off under vacuum and replaced by water. The solution is acidified with glacial acetic acid to a pH of 6. The precipitate is vacuum-filtered and dried under vacuum at 50°. The crude product (11.4 g.) is stirred in 115 ml. of water and 58 ml. of glacial acetic acid. The turbid solution is filtered and mixed, under ice cooling, with 92 ml. of 6 N sodium hydroxide solution. During this procedure, 9.5 g. (73% of theory) of the acetate of β-(2,4,6-triiodo-3-acetamidino-phenyl)-propionic acid is precipitated, M.P. 158–161°.

(c) 6.4 g. of this acetate is suspended in 30 ml. of water, dissolved with 10 ml. of 2 N NaOH, and mixed with the equivalent amount of calcium acetate. The low-soluble calcium salt of β - (2,4-6-triiodo-3-acetamidinophenyl)-propionic acid is thus precipitated. The yield is 5.5 g. (91% of theory), M.P. 283-285° (decomposition).

EXAMPLE 2

(a) β-(2,4,6-triiodo - 3 - aminophenyl)-propionic acid is esterified with ethanol under the addition of sulfuric acid (melting point of the ethyl ester: 122–124°) and thereafter reacted with acetyl chloride. A suspension of 18.3 g. of this β-(2,4,6-triiodo-3-acetylaminophenyl)-propionic acid ethyl ester (M.P. 187–188°) in 300 ml. of methylene chloride is agitated with 6.3 g. of phosphorus pentachloride for 30 minutes, thus forming a solution. Then the reaction mixture is gradually mixed with 10 ml. of liquefied methylamine under ice cooling, and further stirred for 20 hours without cooling. Thereafter, the precipitate is vacuum-filtered and the filtrate concentrated under vacuum. By working up the reaction mixture in accordance with Example 1(a), 16.2 g. (86.5% of theory) of crude ethyl ester of β - (2,4,6-triiodo-3-N-methylacetamidinophenyl)-propionic acid is obtained, M.P. 129–131°. Upon recrystallization from acetonitrile, a melting point of 133–135° is obtained.

(b) The saponification of the crude product (15 g.) in accordance with Example 1(b) yields, by the addition of hydrochloric acid to a pH of 6, a precipitate, which latter is suspended in 60 ml. of water and mixed with semi-concentrated sodium hydroxide solution to a pH of 9. After the transitory formation of a solution, 13.6 g. (76%) of the sodium salt of β - (2,4,6-triiodo-3-N- methylacetamidinophenyl)-propionic acid is precipitated; M.P. from 257° with decomposition.

EXAMPLE 3

(a) 50 g. of the ethyl ester of β-(2,4,6-triiodo-3-acetylaminophenyl)-propionic acid is reacted, analogously to Example 2(a), with phosphorus pentachloride and dimethylamine and worked up in a corresponding manner. The residue is dissolved in ether, treated with charcoal, dried, stirred with hexane, and filtered off. The yield is 41.6 g. (80% of theory) of the ethyl ester of β-(2,4,6-triiodo - 3-N-dimethylacetamidinophenyl)-propionic acid, M.P. 82–84°.

(b) By saponifying the ester (21 g.) in accordance with Example 1(b), and after the addition of concentrated hydrochloric acid to a pH of 1, the crude acid is obtained as the hydrochloride, M.P. 264–265° (decomposition). This crude acid is dissolved in water under the addition of sodium hydroxide solution to a pH of 8 and then precipitated as the free acid with the addition of semi-concentrate hydrochloric acid to a pH of 5. The yield is 15.1 g. (75% of theory) of β-(2,4,6-triiodo-3-N-dimethylacetamidinophenyl)-propionic acid, M.P. 108–110°.

EXAMPLE 4

(a) The ethyl ester of β-(2,4,6-triiodo-3-acetylaminophenyl)-propionic acid is reacted, analogously to Example 2(a), with phosphorus pentachloride and monoethylamine, and worked up. The crude ethyl ester of β-(2,4,6 - triiodo-3-N-ethylacetamidinophenyl)-propionic acid is quantitatively obtained in the form of an oil.

(b) The saponification and further processing of the crude product in accordance with Example 2(b) yield the crude acid as the hydrochloride (melting point from 175°) and, from this compound, the free β-(2,4,6-triiodo-3-N-ethylacetamidinophenyl)-propionic acid, M.P. from 120°; yield: 65%.

EXAMPLE 5

(a) The ethyl ester of β-(2,4,6-triiodo-3-acetylaminophenyl)-propionic acid is reacted, analogously to Example 2(a), with phosphorus pentachloride and pyrrolidine, and worked up. The crude ethyl ester of β-(2,4,6-triiodo-3 - N-tetramethyleneacetamidinophenyl)-propionic acid is obtained in the form of an oil.

(b) Saponifying the crude product in accordance with Example 1(b) yields, after precipitation with hydrochloric acid, the crude acid. The latter is dissolved in 2 N acetic acid as the acetate, simply filtered, and precipitated by the addition of concentrated hydrochloric acid to a pH of 1. The yield is 67% of theory of β-(2,4,6-triiodo-3-N-tetramethyleneacetamidinophenyl)-propionic acid hydrochloride, M.P. 246–248° (decomposition).

EXAMPLE 6

(a) The ethyl ester of β-(2,4,6-triiodo-3-aminophenyl)-propionic acid is reacted, analogously to Example 1(a), first with propionyl chloride to the ethyl ester of β-(2,4,6-triiodo - 3 - propionylaminophenyl)-propionic acid (M.P. 187–188°) and then with phosphorus, pentachloride and ammonia to the ethyl ester of β-(2,4,6-triiodo-3-propionamidinophenyl)-propionic acid. The oily crude product is obtained in a quantitative yield.

(b) The sodium salt solution produced during the saponification of the crude ester analogously to Example 1(b) is concentrated to a crystalline slurry under vacuum. During this step, the sodium salt is separated in a 80% yield. For purposes of purification, the sodium salt is then dissolved in ten times the amount of ethanol, treated with charcoal, filtered, mixed with five times the amount of water, and again concentrated into a crystalline slurry under vacuum, thus obtaining 80% of pure sodium salt of β-(2,4,6-triiodo-3-propionamidinophenyl)-propionic acid, M.P. 284–286° (decomposition).

EXAMPLE 7

(a) The reactions are conducted as in Example 6(a), but with the use of dimethylamine in place of ammonia, thus obtaining, in a quantitative yield, the ethyl ester of β - (2,4,6 - triiodo-3-N-dimethylpropionamidinophenyl)-propionic acid in the form of a gradually crystallizing oil.

(b) After saponifying and working up the crude ester in accordance with Example 5(b), the hydrochloride of β - (2,4,6 - triiodo-3-N-dimethylpropionamidinophenyl)-propionic acid is obtained in an 83% yield, M.P. from 236° (decomposition).

EXAMPLE 8

(a) β-(2,4,6-triiodo-3-aminophenyl)-α-methylpropionic acid is esterified in methanol with the addition of sulfuric acid. From this oily methyl ester, the methyl ester of β - (2,4,6 - triiodo-3-N-propionylaminophenyl)-α-methylpropionic acid is obtained with propionyl chloride in a 90% yield. The melting point is 160–162° (acetonitrile). The reaction with phosphorus pentachloride and dimethylamine analogously to Example 2(a) yields the oily methyl ester of β - (2,4,6-triiodo-3-dimethylpropionamidinophenyl)-α-methylpropionic acid in a quantitative production.

(b) By saponifying the crude ester in accordance with Example 1(b), the low-soluble sodium salt is obtained which is then recrystallized from water, thus obtaining an 85% yield. The free β-(2,4,6-triiodo-3-N-dimethylpropionamidinophenyl)-α-methylpropionic acid exhibits a blurred melting point from 85°.

EXAMPLE 9

(a) β - (2,4,6-triiodo-3-aminophenyl)-α-ethylpropionic acid is esterified in methanol with the addition of sulfuric acid. From the oily methyl ester, the methyl ester of β-(2,4,6 - triiodo-3-propionylaminophenyl)-α-ethylpropionic acid is obtained with propionyl chloride in an 85% yield; M.P. 132–134° (acetonitrile). The reaction with phosphorus pentachloride and dimethylamine, analogously to Example 2(a), results in the oily methyl ester of β-2,4,6-triiodo - 3-N-dimethylpropionamidinophenyl)-α-ethylpropionic acid in a quantitative yield.

(b) By the saponification of the crude ester in accordance with Example 8(b), the low-soluble sodium salt is obtained. From the latter, the free β-(2,4,6-triiodo-3-N-dimethylpropionamidinophenyl)-α-ethylpropionic acid is obtained with dilute hydrochloric acid, in a 76% yield, M.P. from 90°.

EXAMPLE 10

1.25 kg. of the substance obtained in accordance with Example 8(b) is formed into a paste in a masticator, together with 0.5 l. of starch paste containing 25 g. of corn starch. The moist mass is granulated in the usual manner in a granulator and dried under vacuum; the finished granulated material is then mixed with 30 g. of talc and 6 g. of magnesium stearate and compressed into tablets having a content of effective ingredient of 500 mg. The molded blanks can be coated with a lacquer of "Endragit" and silicone resin.

EXAMPLE 11

3 g. of the calcium salt of β-(2,4,6-triiodo-3-acetamidinophenyl)-propionic acid, exhibiting poor solubility in water (Example 1[c]), is mixed with 2.5 g. of sugar, 25 mg. of sodium lauryl sulfonate, 100 mg. of sodium carboxymethylcellulose and 25 mg. of flavor-ameliorating agents. This powder can be readily ingested after being shaken up in 25 ml. of water.

EXAMPLE 12

The sodium salt of β-(2,4,6-triiodo-3-N-methylacetamidinophenyl)-propionic acid, obtained in accordance with Example 2(b), is filled into gelatin capsules. Each capsule contains 500 mg. of effective agent. For the manufacture of the capsules by machine, the sodium salt can be worked into a fluid paste with 40% of sesame oil.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Compounds of the formula

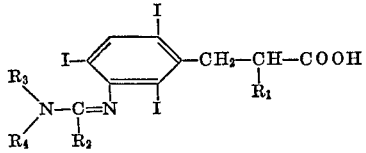

wherein $R_1$ is a hydrogen atom or lower-alkyl, $R_2$ is lower alkyl, and $R_3$ and $R_4$, each is a hydrogen atom or lower-alkyl, or $R_3$ and $R_4$, collectively with the nitrogen atom to which they are attached, are pyrrolidino, morpholino, piperazino or piperidino.

2. A compound of claim 1 wherein $R_2$ is methyl or ethyl and $R_1$, $R_3$ and $R_4$ each is a hydrogen atom, methyl or ethyl.

3. A compound of claim 1, β-(2,4,6-triiodo-3-acetamidinophenyl)-propionic acid.

4. A compound of claim 1, β-(2,4,6-triiodo-3-N-methylacetamidinophenyl)-propionic acid.

5. A compound of claim 1, β-(2,4,6-triiodo-3-N-dimethylacetamidinophenyl)-propionic acid.

6. A compound of claim 1, β-(2,4,6-triiodo-3-N-dimethylpropionamidinophenyl)-propionic acid.

7. A compound of claim 1, β-(2,4,6-triiodo-3-N-dimethylpropionamidinophenyl)-α-methylpropionic acid.

8. A compound of claim 1, β-(2,4,6-triiodo-3-N-dimethylpropionamidinophenyl)-α-ethylpropionic acid.

9. A compound of claim 1, β-(2,4,6-triiodo-3-N-ethylacetamidinophenyl)-propionic acid.

10. A compound of claim 1, β-(2,4,6-triiodo-3-N-tetramethyleneacetamidinophenyl)-propionic acid.

11. A compound of claim 1, β-(2,4,6-triiodo-3-propionamidinophenyl)-propionic acid.

12. A compound of claim 1 as a physiologically acceptable salt.

13. A compound of claim 12 wherein the salt is an alkali-metal salt.

14. A compound of claim 13 wherein the salt is the sodium salt.

15. A compound of claim 12 wherein the salt is the calcium salt.

16. A compound of claim 12 wherein the salt is an acid addition salt.

17. A compound of claim 16 wherein the salt is the hydrochloride.

References Cited
UNITED STATES PATENTS
3,119,859   1/1964   Priewe et al. _____ 260—471

JOSEPH A. NARCAVAGE, Primary Examiner

U.S. Cl. X.R.

260—239 E, 247.2 R, 293.72, 518 A, 768 R; 424—274, 309